340-870.17 SR
3/3/87 OR H 000,240

United States Statutory Invention Registration [19]

[11] Reg. Number: H240
[43] Published: Mar. 3, 1987

Swenson

[54] VARIABLE LENGTH AND SENSOR SPACING THERMISTOR ARRAY

[75] Inventor: Richard C. Swenson, Carriere, Miss.

[73] Assignee: The United States of America as represented by the Secretary of the Navy, Washington, D.C.

[21] Appl. No.: 582,238

[22] Filed: Feb. 22, 1984

[51] Int. Cl.[4] ..... G08C 19/12; G08B 21/00
[52] U.S. Cl. ..... 340/870.17; 340/870.16; 73/300; 374/142
[58] Field of Search ..... 374/142, 183, 170; 73/300; 340/870.16, 870.17; 441/11

[56] References Cited

U.S. PATENT DOCUMENTS

| | | | |
|---|---|---|---|
| 3,805,256 | 4/1974 | Pepin | 340/870.17 |
| 4,448,068 | 5/1984 | Sutherland | 374/142 |
| 4,471,354 | 9/1984 | Smith | 340/870.17 |
| 4,557,608 | 12/1985 | Carver | 340/870.17 |

*Primary Examiner*—Stephen C. Buczinski
*Assistant Examiner*—Linda J. Wallace
*Attorney, Agent, or Firm*—Robert F. Beers; Thomas M. Phillips

[57] ABSTRACT

An adaptable thermistor array of variable length and sensor spacing. A plurality of thermistor modules are attached at any desired interval to a braided line. Each thermistor module contains its own power source, sensor, and an acoustic telemetry transmitter to transmit the temperature related data from the module to an acoustic receiver in a buoy from which the line depends.

1 Claim, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VARIABLE LENGTH AND SENSOR SPACING THERMISTOR ARRAY

BACKGROUND OF THE INVENTION

1. Field of the Invention

The present invention relates to obtaining a temperature profile of the upper ocean and more particularly to a variable length and sensor spacing array supported by a remote buoy.

2. Description of the Prior Art

Small remote buoys supporting thermistor arrays have been in use for many years by the oceanographic community to measure the water temperature profile of the upper ocean. These systems use copper conductors of various lengths to reach thermistors distributed along the aperture of the array. Various techniques are used to incorporate these into a cable and, in some cases, a mooring line. However, these arrays are rigidly made for a specific length and sensor spacing, and different arrays are required for different uses. Further, changes in conductivity of the copper conductors and/or insulation results in temperature measurement uncertainties.

SUMMARY OF THE INVENTION

Accordingly the present invention provides an adaptable thermistor array of variable length and sensor spacing. A plurality of thermistor modules are attached at any desired interval to a braided line. Each thermistor module contains its own power source, sensor, and an acoustic telemetry transmitter to transmit the temperature related data from the module to an acoustic receiver in a buoy from which the line depends.

Thus it is an object of the present invention to provide a thermistor array which can be readily varied as to length and sensor spacing.

Another object of the present invention is to provide a thermistor array which eliminates temperature measurement uncertainties due to changes in copper conductor/insulation conductivity.

Other objects, novel features and advantages will be apparent from the following detailed description when read together with the appended claims and attached drawing.

DESCRIPTION OF THE PREFERRED EMBODIMENT

Figure 1:
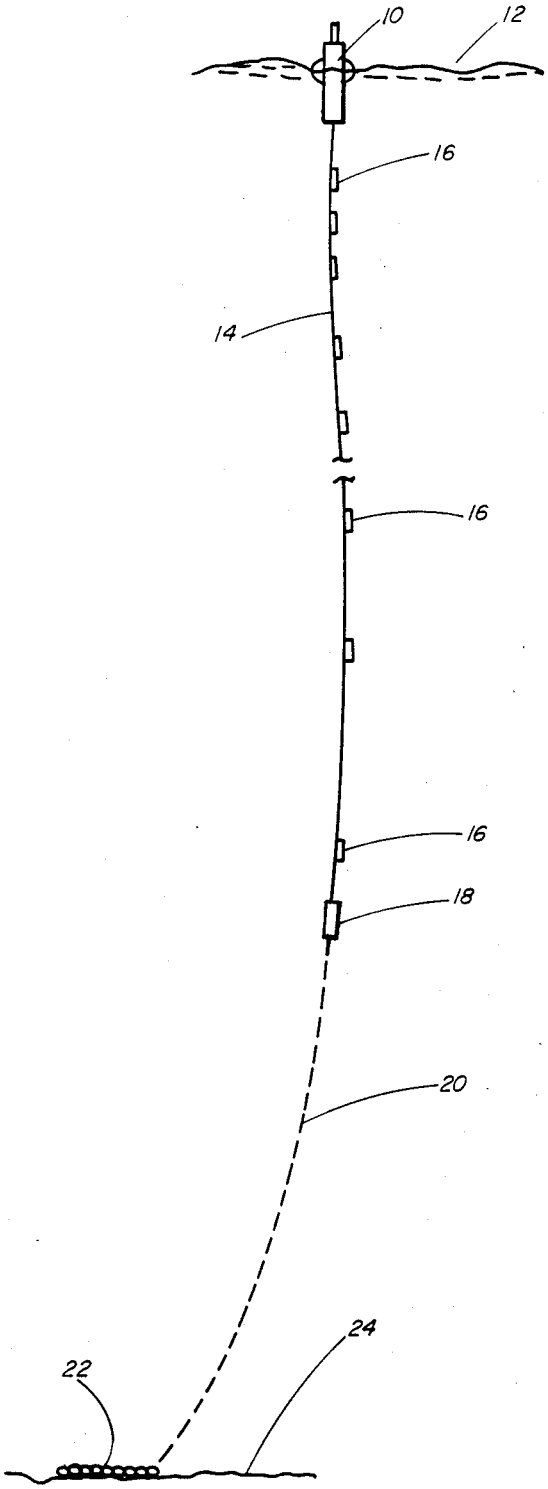
FIG. 1 is a pictorial view of a temperature profiling system according to the present invention.

Referring now to FIG. 1 a remote buoy 10 is shown on the surface 12 of a body of water. Suspended from the buoy 10 is a line 14 to which are attached a plurality of sensor modules 16 at variable spacings. At the end of the line 14 is a weight 18 to maintain the line in an essentially vertical orientation. A mooring cable 20 may be attached to the end of the line 16 to form a moored buoy system, and is terminated by an anchor 22, such as a heavy chain, on the sea floor 24.

Figure 2:
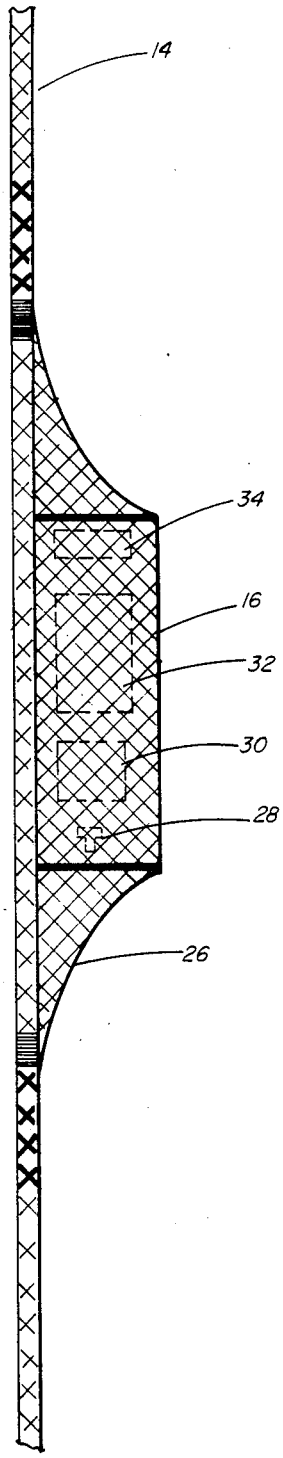
FIG. 2 is a plan view of a thermistor module attached to a braided line according to the present invention.

As shown in FIG. 2 the line 14 is braided. The sensor module 16 is retained in a tubular net 26 whose ends are tuck spliced into the braided line 14. Additionally the ends of the net 26 are seized to the line 14 to assure that the module 16 is securely attached. Each module 16 has a sensor 28, such as a thermistor for temperature measurements, an associated electronics package 30 with a clock, a power source 32 such as a battery, and an acoustic transmitter 34. These components are sealed or potted in polyurethane in a pipe, such as 3 to 4 inch diameter PVC 8 inches in length, which forms the housing of the module 16. The removal of a magnet (not shown) attached to the exterior of the module 16 serves to initiate it by releasing an interior contact to energize the power source 32.

In operation each array can be prepared in the field using standard seamanship techniques. Each module 16 to be attached to a given array line 14 has a different frequency for unit identificaton. The modules 16 are attached to the line 14 at any desired intervals, the magnets are removed, and the array is deployed. At periodic intervals, such as every 12 hours, determined by the clocks in the respective electronic packages each xodule 16 transmits its unique frequency modulated in proportion to the resistance of the thermistor 28. An acoustic receiver in the buoy 10 receives the data, processes it for retransmission such as to a standard ARGOS satellite. The data may be stored in a recorder and played back upon command. Approximately fifteen modules 16 are required per array which vary in length from 100 meters in the Arctic to 600 meters in the equatorial zones.

Thus, the present invention provides a variable length and sensor spacing thermistor array which can be used in either a free drifting or a xoored configuration to provide periodic temperature profiles in the upper levels of any body of water without degradation due to copper conductor/insulation resistance changes, and which may be readily configured in the field for a specific application using ordinary seamanship techniques.

What is claimed is:

1. A variable length and spacing thermistor array comprising:

a buoy having an acoustic receiver and means for retransmitting data received by said acoustic receiver;

a braided line having a weight at the end said braided line being suspended from said buoy and having a length dependent upon the oceanographic environment where said array is to be deployed;

a plurality of thermistor modules, each of said thermistor modules having a thermistor, an acoustic transmitter with a unique frequency, means for sequentially activating each of said acoustic transmitters at periodic intervals;

means for attaching said thermistor modules to said braided line at variable intervals dependent upon the oceanographic environment where said array is to be deployed; and said attaching means comprising a tubular net within which said thermistor module is contained, the ends of said tubular net being woven into and seized onto said braided line.

* * * * *